United States Patent
Fecher et al.

(10) Patent No.: US 10,803,163 B2
(45) Date of Patent: Oct. 13, 2020

(54) METHOD OF MODULAR VERIFICATION OF A CONFIGURATION OF A DEVICE

(71) Applicant: SICK AG, Waldkirch (DE)

(72) Inventors: Harald Fecher, Waldkirch (DE); Jörg Moddemann, Waldkirch (DE); Martin Wehrle, Waldkirch (DE)

(73) Assignee: SICK AG, Waldkirch (DE)

( * ) Notice: Subject to any disclaimer, the term of this patent is extended or adjusted under 35 U.S.C. 154(b) by 126 days.

(21) Appl. No.: 16/202,656

(22) Filed: Nov. 28, 2018

(65) Prior Publication Data

US 2019/0180022 A1   Jun. 13, 2019

(30) Foreign Application Priority Data

Dec. 12, 2017  (EP) .................................. 17206727

(51) Int. Cl.
*G06F 21/44* (2013.01)
*G05B 19/042* (2006.01)

(52) U.S. Cl.
CPC ........... *G06F 21/44* (2013.01); *G05B 19/042* (2013.01)

(58) Field of Classification Search
CPC .............................. G06F 21/44; G05B 19/042
(Continued)

(56) References Cited

U.S. PATENT DOCUMENTS

| | | | | |
|---|---|---|---|---|
| 5,326,104 A | * | 7/1994 | Pease | A63F 3/081 273/269 |
| 5,901,320 A | * | 5/1999 | Takahashi | G06F 8/71 709/223 |

(Continued)

FOREIGN PATENT DOCUMENTS

| | | |
|---|---|---|
| DE | 102009044555 A1 | 5/2010 |
| DE | 102009019089 A1 | 11/2010 |

(Continued)

OTHER PUBLICATIONS

Structured Computer Organization third edition Andrew S. Tanenbaum (Year: 1990).*

(Continued)

*Primary Examiner* — Paul R. Myers
(74) *Attorney, Agent, or Firm* — Nath, Goldberg & Meyer; Jerald L. Meyer

(57) ABSTRACT

To ensure a simple and secure verification of a device, in particular of a safety controller, a method of verifying a configuration of a device, in particular of a safety controller, is provided, said method comprising the steps of subdividing the configuration of the device into at least two part configurations that are validated, of allocating the part configurations to at least one part configuration sequence in which a dependence on a verification of the part configurations on one another is predefined, of determining parameters of each part configuration, with the parameters being used for verifying the respective part configurations, of calculating a single checksum that reproduces the verification of the part configurations, with the single checksum of a preceding part configuration being recalculated in the verification of a part configuration following in the part configuration sequence and with the verification of the preceding part configuration being confirmed on an agreement of the single checksum, and with the configuration of the device being verified when the last part configuration has been verified for each part configuration sequence.

16 Claims, 3 Drawing Sheets

Figure 1:
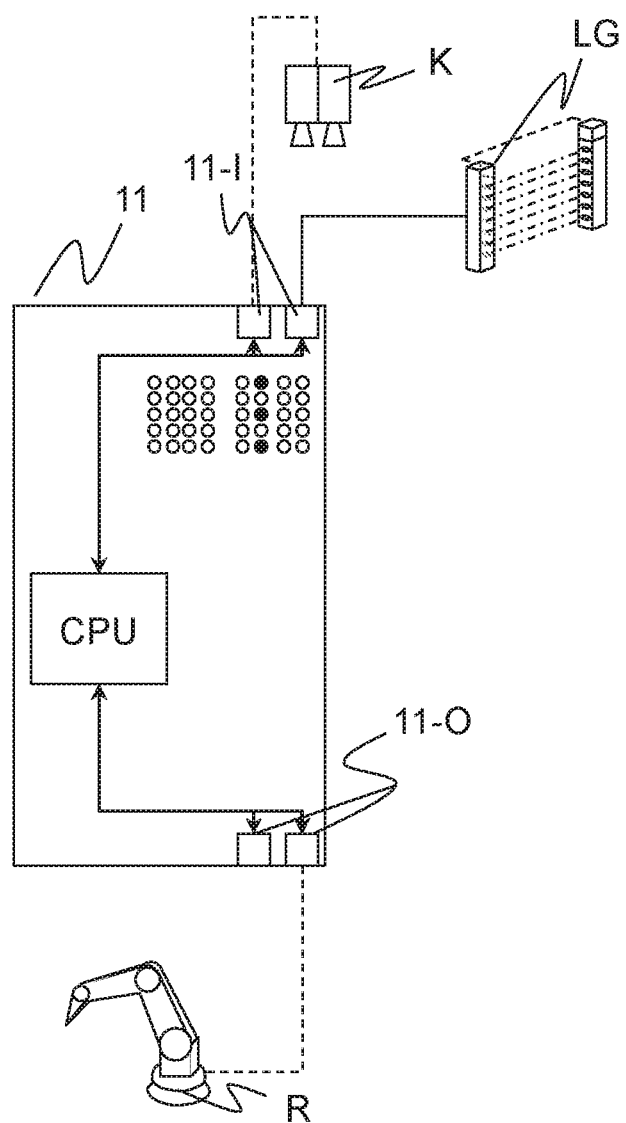

(58) Field of Classification Search
USPC .......................................................... 713/1
See application file for complete search history.

(56) References Cited

U.S. PATENT DOCUMENTS

| | | | | |
|---|---|---|---|---|
| 5,974,476 | A * | 10/1999 | Lin | H03K 19/018585 326/30 |
| 5,995,977 | A * | 11/1999 | Presler-Marshall | G06F 9/544 |
| 7,278,128 | B1 * | 10/2007 | Trimberger | G06F 30/34 716/117 |
| 7,310,759 | B1 * | 12/2007 | Carmichael | G06F 11/1004 714/725 |
| 8,468,330 | B1 * | 6/2013 | Reed | G06F 21/51 713/164 |
| 8,886,995 | B1 * | 11/2014 | Pallapothu | G06F 11/1471 714/15 |
| 9,913,236 | B2 * | 3/2018 | Allen | H04L 61/2592 |
| 2002/0102999 | A1 * | 8/2002 | Maggenti | H04W 76/45 455/518 |
| 2003/0122578 | A1 * | 7/2003 | Masui | G06F 21/76 326/39 |
| 2003/0163734 | A1 * | 8/2003 | Yoshimura | H04L 63/145 726/22 |
| 2007/0061427 | A1 * | 3/2007 | Vishnia-Shabtai | G06Q 30/0633 709/220 |
| 2008/0244686 | A1 * | 10/2008 | Li | G06F 21/64 726/1 |
| 2009/0265036 | A1 * | 10/2009 | Jamieson | G05B 19/0426 700/259 |
| 2013/0111440 | A1 * | 5/2013 | Forster | G06F 8/71 717/121 |
| 2016/0117210 | A1 * | 4/2016 | Reichenbach | G06F 11/0712 714/37 |
| 2016/0350317 | A1 * | 12/2016 | Bertossi | G06F 16/116 |
| 2016/0359866 | A1 * | 12/2016 | Mixer | H04L 63/0876 |

FOREIGN PATENT DOCUMENTS

| | | |
|---|---|---|
| DE | 102010061733 A1 | 5/2012 |
| DE | 102013112488 A1 | 5/2015 |
| EP | 0587936 A1 | 3/1994 |
| WO | 2006063919 A2 | 6/2006 |

OTHER PUBLICATIONS

European search report dated Jun. 5, 2018 for corresponding application No. 17206727.4.

* cited by examiner

METHOD OF MODULAR VERIFICATION OF A CONFIGURATION OF A DEVICE

The invention relates to a method of modular verification of a configuration of a device, in particular of a safety controller, in accordance with claim 1.

In safety technology today, it must be ensured on the implementation of a configuration in a device that the provided configuration is correctly implemented to, for example, be able to recognize memory errors of an external input device such as a computer or a smartphone on which the configuration was prepared and/or to be able to recognize transmission errors of the configuration. The checking process is known as verification.

A common verification process comprises visualizing the implemented parameters back onto the input device and to have the correctness of the parameters explicitly confirmed by an authorized user. In this respect, the previous verification process requires knowledge of the total system by the user, that is the knowledge with respect to all the set parameters to be able to carry out the verification of the total configuration of the device. Such a verification is therefore complex and difficult and comprises error sources that make the verification susceptible to errors.

In other words, after the preparation and implementation or transmission of the configuration on or to the device, the verification takes place over the total configuration of the device by selected persons who have to have a complete understanding of the total configuration of the device.

It is therefore an object of the invention to provide a method of modular verification of a configuration of a device with which method a simple and secure verification of the device is ensured.

The object is satisfied in accordance with the invention by a method of modular verification of a configuration of a device having the features of claim 1.

In other words, a method is provided for the modular verification of a configuration of a device, said method comprising the steps of subdividing the configuration of the device into at least two part configurations that are verified, of allocating the part configurations to at least one part configuration sequence in which a dependence on a verification of the part configurations on one another is predefined, of determining parameters of each part configuration, with the parameters being used for verifying the respective part configurations, of calculating a single checksum for each part configuration that reproduces the verification of the part configurations, with the single checksum of a preceding part configuration being recalculated in the verification of a part configuration following in the part configuration sequence and with the verification of the preceding part configuration being confirmed on an agreement of the single checksum, and wherein the configuration of the device is verified when the last part configuration has been verified for each part configuration sequence.

The advantage results from this that the part configurations of different users can be verified, with the users only having to have knowledge or understanding of the respective part configuration to be verified by them and not having to have the total understanding of the configuration of the total device.

In accordance with a preferred embodiment, an input and/or output unit, an interface, and other units of the device are subdivided as part configurations. This enables a reduction of the knowledge for the verification of the configuration of the device with only partial knowledge of the device, with a secure verification of the total configuration of the device nevertheless remaining ensured.

In accordance with a further preferred embodiment, the verification of every directly preceding part configuration is co-confirmed in the following part configuration. This means that the individual checksum of the preceding part configuration is recalculated on the verification of the following part configuration and is compared with the single checksum calculated on the verification of the preceding part configuration so that the verification of the preceding part configuration is only confirmed on an agreement of the individual checksums. In other words, a user, for example, only requires the understanding of the part configuration to be verified by him to verify this part configuration and to confirm the verification of the preceding part configuration if the preceding part configuration had already been verified by another user and the recalculated single checksum of the preceding part configuration is still correct.

Furthermore, in accordance with a further preferred embodiment, the part configuration sequence is branched into different branches so that the part configurations are differently dependent on one another. A technical relationship of the part configurations can hereby be reproduced more intuitively and less ambiguously, for example. Each part configuration is advantageously associated with a verification status, with the verification status of each part configuration depending on the verification status of the preceding part configuration. The verification status in particular indicates whether the part configuration is verified or is not verified. An increased safety level for the verification results from this since the verification of a part configuration cannot be confirmed if the verification status of the preceding part configuration is not verified or changes.

In accordance with a further preferred embodiment, the verification status of the preceding part configuration is changed from verified to not verified when the verification status of the preceding part configuration changes from verified to not verified. The verification status of the part configuration in particular changes when the parameters of the part configuration are changed. It is thereby ensured that the verification along the part configuration sequence is not incorrectly confirmed when the verification status of one of the part configurations of the part configuration sequence is still not yet verified or has changed.

The parameters are preferably first distinguished into first safety-relevant parameters and into second non-safety relevant parameters, with the single checksum being calculated from the first parameters of the part configuration. The second parameters are in particular also indicated beside the single checksum of the preceding part configuration on the verification of the following part configuration. In this respect, the second parameters very particularly comprise a description, preferably in clear text, that reproduces the semantics, a function and/or the verification status of the part configuration. The advantage hereby results that the user who has to verify the following part configuration has knowledge of or information on the preceding part configuration communicated to him via the second parameters so that he can more easily understand a function of the preceding part configuration.

In accordance with a further preferred embodiment, the individual checksum is calculated by an external input device and is displayed to the user for validation. In this respect, the safety-relevant parameters of the part configuration are preferably used for calculating the single checksum, with the safety-relevant parameters of the preceding part configuration entering into the calculation on the calculation of the single checksum of the following part configuration so that the safety-relevant parameters of the preceding part configuration are also taken into account in the single checksum of the following part configuration. The parameters of the preceding part configuration advantageously do not have to be verified by the user since they have already been verified by the verification of the single checksum of the preceding part configuration.

In accordance with a further preferred embodiment, the verification of a part configuration or of a part configuration sequence is protected by an access code, preferably a password or a pin. The user who is to verify a part configuration or a part configuration sequence can hereby not access details of the preceding part configuration or part configuration sequence without the access code since it is protected from him by encryption and only the single checksum of the preceding part configuration or part configuration sequence is displayed for recalculation and for confirmation. The verification of the part configuration is in particular allocated to a predefined authentication level so that only authenticated users such as an authorized customer or a member of support staff has access to the allocated part configuration and carries out the verification.

In accordance with a further preferred embodiment, the last part configuration of all the part configuration sequences is the same. This means that all the part configuration sequences have a common last part configuration so that the part configuration sequences are verified with the calculation of the single checksum of the last part configuration. On the other hand, the last part configuration is preferably different from at least two part configuration sequences. In other words, if at least two part configuration sequences are subdivided and if the part configuration sequences are technically independent of one another, each part configuration sequence has a last part configuration, with the last part configurations likewise being independent of one another. The part configuration sequences are verified by the calculation of the respective single checksum of the last part configurations.

Preferred embodiments and further developments as well as further advantages of the invention can be seen from the dependent claims, from the following description and from the drawings.

The invention will also be explained in the following with respect to further advantages and features with reference to the enclosed drawing and to embodiments. The Figures of the drawing show in:

FIG. 1 a schematic representation of a safety controller; and

Figure 2:
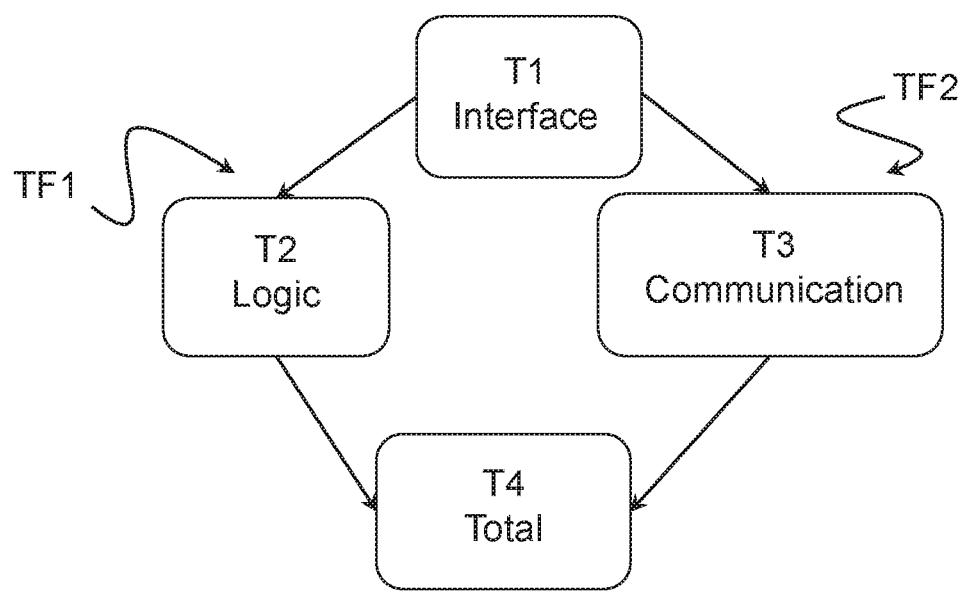

FIG. 2 a schematic representation of a method in accordance with the invention.

Figure 3:
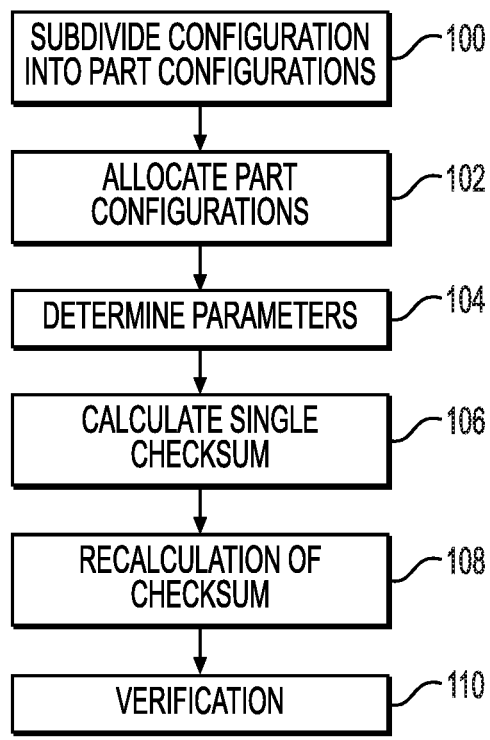

FIG. 3 is a flowchart showing steps of the method of modular verification of a configuration of a device.

FIG. 1 shows a schematic representation of an exemplary safety controller 11 that is to be configured as a device so that a configuration of the safety controller 11 or of the device is verified. A method in accordance with the invention of modular verification of the device or of the safety controller 11 is described in the following with reference to the exemplary safety controller 11. In this respect, the configuration of the device or of the safety controller 11 is prepared on an external input device such as preferably a computer or a smartphone and is then implemented on or transmitted to the device or to the safety controller 11. The implementation of the configuration is displayed on the external input device so that a user can confirm the configuration and can thus exclude a possible memory error of the external input device and/or a transmission error.

The safety controller 11 is provided to receive input signals from signal generators connected to the safety controller 11. The signal generators are a camera K and a light grid LG in the embodiment shown and are each connected to input connectors 11-I of the safety controller 11. The received input signals of the camera K and of the light grid LG are communicated by the input connections 11-I to a control unit CPU of the safety controller 11, with the control unit CPU being able to comprise at least one processor having a corresponding logic.

The control unit 11 evaluates the input signals and generates corresponding outgoing output signals that are communicated by the control unit 11 to output connectors 11-O of the safety controller 11. The output signals serve to reliably control an actuator connected to at least one of the output connectors 11-O. In this respect, an industrial robot R represents the actuator in the embodiment shown.

Corresponding to an application of the industrial robot R and of the camera K monitoring the industrial robot R or its environment and of the light grid LG, the safety controller 11 has to be configured and the configuration has to be verified.

The method in accordance with the invention subdivides the configuration into at least two part configurations that are verified (step 100 of FIG. 3).

This means that as in an embodiment shown in FIG. 2, the method, for example, subdivides the configuration of the safety controller 11 into four part configurations T1, T2, T3, and T4. An input and/or output unit, a control, an interface, and other units of the device or of the safety controller 11 are in particular subdivided as part configurations. The part configurations are marked by T1 for the "interface", by T2 for the "logic", by T3 for the "communication", and by T4 for "total" in the embodiment in the following.

The part configurations T1 to T4 are allocated in accordance with the invention to at least one part configuration sequence TF1 and TF2 in which a dependence of a verification of the part configurations on one another is predefined (step 102 of FIG. 3).

In accordance with the embodiment shown, the part configurations T1, T2, and T4 are allocated to one another in a first part configuration sequence TF1. In a second part configuration sequence TF2, the part configurations T1, T3, and T4 are allocated to one another. In this respect, the arrow directions of the connections between the part configurations T1 to T4 do not represent a direction of a data exchange between the physical components. The arrow directions symbolize an order of the verification of the part configuration sequences TF1 and TF2 since the verification of the first part configuration sequence TF1 and of the second part configuration sequence TF2 is dependent on the respective allocated part configurations T1, T2, and T4 or T1, T3, and T4.

In other words, the part configuration T2 of the part configuration sequence TF1 can, for example, not be verified if the preceding part configuration T1 has not already been verified. This means that the following part configuration T4 cannot be verified if the first and second part configuration sequences TF1 and TF2 have not already been completely verified.

The method in accordance with the invention determines parameters of each part configuration T1 to T4, with the parameters being used for verifying the respective part configurations T1, T2, T3, and T4 (step 104 of FIG. 3).

In this respect, for example, the parameters of the part configuration T3 can comprise a quantity, an occupation or an addressing, or a data transmission rate of the input and output connectors II-I and II-O. The parameters of the part configuration T1 can, for example, comprise a quantity of ingoing and outgoing data types, with the parameters preferably being defined by the method or by the user.

A single checksum that reproduces the verification of the part configurations T1, T2, T3, and T4 is calculated for each part configuration T1, T2, T3, and T4 (step 106 of FIG. 3).

This means that in accordance with FIG. 2, the part configuration T1 ("interface") has an individual single checksum calculated from its parameters and the part configuration T1 is marked as verified by it. The part configuration T2 ("logic") or T3 ("communication") has an individual single checksum calculated from its parameters and in particular from safety-relevant parameters of a preceding part configuration T1 so that the parameters of the preceding part configuration T1 are also taken into account in the single checksum of the following part configurations T2 or T3. The part configuration T4 ("total") has an individual single checksum calculated from its parameters and in particular from safety-relevant parameters of the preceding part configurations T1, T2, and T3 so that the parameters of the preceding part configurations T1, T2, and T3 are considered in the single checksum of the part configuration T4. The respective single checksum thus represents a value from the respective parameters of the part configuration T1, T2, T3, or T4 and from the parameters of the respective preceding part configuration T1, T2, T3 with which an integrity of the parameters can be checked.

On the verification of a part configuration T2 and T4 or T3 and T4 following in the part configuration sequence TF1 or TF2, the single checksum of the preceding part configuration T2 and T1 or T3 and T1 is recalculated and the safety-verification of the preceding part configuration is confirmed on an agreement of the single checksum of the respective preceding part configuration (step 108 of FIG. 3). The recalculation of the single checksum is preferably carried out by means of the external input device.

In other words and with respect to FIG. 2, the respective single checksums of the preceding part configuration T1 is recalculated on the verification of the following part configuration T2 or T3. On an agreement between the individual single checksum of the part configuration T1 with the recalculated single checksum for the part configuration T1, the following part configurations T2 and T3 can confirm the verification of the configuration of the preceding part configuration T1 and can verify its own configuration by the calculation of its own single checksum from its own parameters and from the, in particular safety-relevant, parameters of the preceding part configuration T1. On the verification of the following part configuration T4, the respective single checksums of the preceding part configurations T2 and T3 are recalculated and the verification of the part configurations T2 and T3 is confirmed on an agreement of the single checksums calculated on the verification and the recalculated single checksums of the part configurations T2 and T3.

The user who, for example, has to verify the part configuration T1 ("interface"), thus only requires the technical understanding with respect to the configuration of the part configuration T1 or knowledge of the parameters of the part configuration T1.

The user who, for example, has to verify the part configuration T2 ("logic") only requires the technical understanding with respect to the configuration of the part configuration T2 or knowledge of the parameters of the part configuration T2 and the single checksum of the preceding part configuration T1 to confirm the verification of in particular the parameters of the part configuration T1 with the recalculated single checksum of the preceding part configuration T1 and to conclude the verification of the part configuration T2. The user in this respect does not require any knowledge of the parameters of the part configuration T1.

The user who, for example, has to verify the part configuration T3 ("communication") only requires the technical understanding with respect to the configuration of the part configuration T3 or knowledge of the parameters of the part configuration T3 and the single checksum of the preceding part configuration T1 to confirm the verification of in particular the parameters of the part configuration T1 with the recalculated single checksum of the preceding part configuration T1 and to conclude the verification of the part configuration T3. The user here also does not require any knowledge of the parameters of the part configuration T1.

Finally, the configuration of the device or of the safety controller 11 is verified when the last part configuration T4 ("total") is verified for each part configuration sequence TF1 and TF2 (step 110 of FIG. 3).

This means that the configuration of the last part configuration T4 ("total"), as shown in FIG. 2, is verified when the recalculated single checksum of the part configurations T2 ("logic") and T3 ("communication") agrees with its respective single checksum calculated on its verification and when the single checksum of the part configuration T4 is correct. The verification of the respective part configuration sequences TF1 and TF2 is thus confirmed and the configuration of the total device or of the total safety controller 11 is verified. In this respect, the user only requires knowledge of the specific parameters of the part configuration T4 in the verification of the part configuration T4, with the safety-relevant parameters of the preceding part configurations T1, T2, and T3 also being taken into account in the calculation of the single checksum of the part configuration T4. The parameters of the part configuration T4 could, for example, comprise the part configuration T4 having two part configurations T2 and T3.

The parameters of the part configuration T1 can in particular not be communicated to the user for the verification of the last part configuration T4 because these parameters have already also been considered or confirmed in the verification of the part configurations T2 and T3. A number of parameters that the user responsible for a part configuration following later in the part configuration sequence TF1 or TF2 has to verify is thus automatically reduced.

The user who ultimately verifies the configuration of the total device or of the total safety controller 11 thereby only requires understanding with respect to the part configuration T4 to be verified by him or knowledge of the respective parameters. He does not need any understanding of the total configuration or knowledge with respect to all the parameters of the configuration of the total safety controller 11 to verify the device or the safety controller 11 since in particular the following part configuration verifies every directly preceding part configuration and the user only confirms the verification of the preceding part configuration with reference to the recalculated single checksum and not with reference to the specific parameters of the preceding part configuration.

Each part configuration T1 to T4 is advantageously associated with a verification status, with the verification status of each part configuration T2 to T4 depending on the verification status of the preceding part configuration T1 to T3. The verification status in this respect indicates whether the part configuration T1 to T4 is verified or not verified.

That is, in other words, in accordance with FIG. 2, the verification status of the part configuration T4 ("total") is directly dependent on the verification status of the part configuration T2 ("logic") and T3 ("communication"). The verification status of the part configurations T2 is not dependent on the verification status of the part configuration T3 and vice versa. It is hereby possible that single part configurations T1, T2, T3, and T4 or part configuration sequences TF1 and TF2 are prepared and verified in a modular manner from one another by different users without one user having to have complete knowledge with respect to all the parameters and part configurations T1 to T4.

This in turn means that if the part configurations T2 and T3 should be completely independent of one another with respect to technical function, the part configuration T4 could be dispensed with since the verification of the configuration of the device or of the safety controller 11 can be completed by the verification of the part configuration sequences TF1 and TF2 and thus of the part configurations T2 and T3 and no further verification status would be necessary.

This further means that the part configuration T4 is only verifiable if the verification status of the part configurations T2 and T3 is set to a verification status "verified". In the case that, for example, the verification status of the part configuration T3 changes from "verified" to "not verified" because the parameters of the part configuration T3 was changed, the user responsible for the verification of the part configuration T4 can then nevertheless confirm the verification of the configuration of the part configuration T2 and thus also indirectly of the part configuration T1 if the recalculated single checksum of the part configuration T2. He only has to separately verify the part configuration T3 by recalculating the single checksum of the part configuration T3 by means of the new parameters of the part configuration T3 for the verification of the part configuration T4. In this case, the user can also verify the part configurations T3 and T4 together by calculating a single checksum from the parameters of the part configurations T3 and T4. However, this case requires that the user has knowledge of both part configurations T3 and T4 to carry out the common verification.

The verification of a part configuration or of a part configuration sequence can hereby be protected by an access code, preferably a password or pin. That is, if, for example, the part configuration T2 is particularly important and has accordingly been verified by the use and protected by an access code, the user responsible for the verification of the following part configuration T4 can carry out the verification of the part configuration T4 by confirming the single checksum of the part configuration T2 and can thus verify the configuration of the total device or of the total safety controller 11. He is, however, not able to access details of the preceding part configuration T2 or part configuration sequence TF1, in particular the corresponding parameters, without the access code.

Part configurations T1, T2, or T3, in particular their parameters, can thereby be kept secret since only the single checksum is displayed to the user of the following part configuration and not the parameters and thus not the configuration of the preceding part configuration per se. The verification of the part configuration T1 to T4 is advantageously allocated to a predefined authentication level so that only authenticated users such as an authorized customer or a member of support staff has access to the allocated part configuration T1 to T4 and carries out the verification. It is hereby ensured that a secure verification by an authorized user is ensured.

The parameters are preferably furthermore distinguished into first safety-relevant parameters and into second non-safety relevant parameters, with the single checksum being calculated from the first parameters of the part configuration T1 to T4. This means that on the verification of the part configuration T1 to T4, the safety-relevant parameters are taken into consideration by the calculation of the single checksum of the part configuration T1 to T4. The non-safety relevant parameters can be taken into account by calculation of a separate single checksum or can be displayed to the user so that the user can better estimate the function of the part configuration T1 to T4. This is in particular useful if, for example, the preceding part configuration is protected by an access code and can thus not be inspected by the verifying user.

REFERENCE NUMERAL LIST 11 safety controller
11-I input connectors
11-O output connectors
CPU control unit
K camera
LG light grid
R industrial robot
T1 part configuration "interface"
T2 part configuration "logic"
T3 part configuration "communication"
T4 part configuration "total"
TF1, TF2 configuration sequence

The invention claimed is:

1. A method of verifying a configuration of a device, said method comprising the steps:
   subdividing the configuration of the device into at least two part configurations that are verified;
   allocating the part configurations to at least one part configuration sequence in which a dependence of a verification of the part configurations on one another is predefined;
   determining parameters of each part configuration, with the parameters being used to verify the respective part configurations;
   calculating for each of the part configurations a single checksum that reproduces the verification of the part configurations;
   with the single checksum of a preceding part configuration being recalculated in the verification of a following part configuration in the part configuration sequence and with the verification of the preceding part configuration being confirmed on an agreement of the single checksums; and
   with the configuration of the device being verified if the last part configuration is verified for each part configuration sequence,
   wherein the parameters are distinguished into first safety relevant parameters and second non-safety relevant parameters, and wherein the single checksum is calculated from the first safety relevant parameters of the part configuration.

2. The method in accordance with claim 1, wherein the device is a safety controller.

3. The method in accordance with claim 1, wherein an input and/or output unit, a control, an interface, and other units of the device are subdivided as part configurations.

4. The method in accordance with claim 1, wherein the verification of every directly preceding part configuration is also confirmed in the verification of the following part configuration.

5. The method in accordance with claim 1, wherein the part configuration sequence is branched into different branches so that the part configurations are differently dependent on one another.

6. The method in accordance with claim 5, wherein each part configuration is associated with a verification status; and wherein the verification status of each part configuration depends on the verification status of the preceding part configuration.

7. The method in accordance with claim 6, wherein the verification status indicates whether the part configuration is verified or not verified.

8. The method in accordance with claim 6, wherein the verification status of the following part configuration is changed from verified to not verified if the verification status of the preceding part configuration changes from verified to not verified.

9. The method in accordance with claim 6, wherein the verification status of the part configuration changes if the parameters of the part configuration are changed.

10. The method in accordance with claim 1, wherein the single checksum is calculated by an external input device and is displayed to a user for validation.

11. The method in accordance with claim 1, wherein the verification of the part configuration is allocated to a predefined authentication level.

12. The method in accordance with claim 1, wherein the last part configuration of all the part configuration sequences is the same.

13. The method in accordance with claim 1, wherein the last part configuration is different from at least two part configuration sequences.

14. A method of verifying a configuration of a device, said method comprising the steps:
  subdividing the configuration of the device into at least two part configurations that are verified;
  allocating the part configurations to at least one part configuration sequence in which a dependence of a verification of the part configurations on one another is predefined;
  determining parameters of each part configuration, with the parameters being used to verify the respective part configurations;
  calculating for each of the part configurations a single checksum that reproduces the verification of the part configurations;
  with the single checksum of a preceding part configuration being recalculated in the verification of a following part configuration in the part configuration sequence and with the verification of the preceding part configuration being confirmed on an agreement of the single checksums; and
  with the configuration of the device being verified if the last part configuration is verified for each part configuration sequence,
  wherein the parameters are distinguished into first safety relevant parameters and second non-safety relevant parameters, and wherein the single checksum is calculated from the first safety relevant parameters of the part configuration, the second non-safety relevant parameters being also indicated beside the single checksum of the preceding part configuration in the verification of the following part configuration.

15. A method of verifying a configuration of a device, said method comprising the steps:
  subdividing the configuration of the device into at least two part configurations that are verified;
  allocating the part configurations to at least one part configuration sequence in which a dependence of a verification of the part configurations on one another is predefined;
  determining parameters of each part configuration, with the parameters being used to verify the respective part configurations;
  calculating for each of the part configurations a single checksum that reproduces the verification of the part configurations;
  with the single checksum of a preceding part configuration being recalculated in the verification of a following part configuration in the part configuration sequence and with the verification of the preceding part configuration being confirmed on an agreement of the single checksums; and
  with the configuration of the device being verified if the last part configuration is verified for each part configuration sequence,
  wherein the parameters are distinguished into first safety relevant parameters and second non-safety relevant parameters, wherein the single checksum is calculated from the first safety relevant parameters of the part configuration, and wherein the second non-safety relevant parameters comprise a description that reproduces at least one of semantics, a function, and a verification status of the part configuration.

16. The method in accordance with claim 15, wherein the second non-safety relevant parameters comprise a description in clear text.

* * * * *